US012789163B2

(12) United States Patent
Murayama et al.

(10) Patent No.: US 12,789,163 B2
(45) Date of Patent: Nov. 10, 2026

(54) ACTIVE ENERGY RADIATION DEVICE

(71) Applicant: HAMAMATSU PHOTONICS K.K., Hamamatsu (JP)

(72) Inventors: Kyoichi Murayama, Hamamatsu (JP); Keita Umeno, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 807 days.

(21) Appl. No.: 18/268,402

(22) PCT Filed: May 26, 2021

(86) PCT No.: PCT/JP2021/020023
§ 371 (c)(1),
(2) Date: Jun. 20, 2023

(87) PCT Pub. No.: WO2022/137595
PCT Pub. Date: Jun. 30, 2022

(65) Prior Publication Data
US 2024/0058784 A1 Feb. 22, 2024

(30) Foreign Application Priority Data
Dec. 24, 2020 (JP) ................................ 2020-215352

(51) Int. Cl.
*B01J 19/12* (2006.01)
*B41M 7/00* (2006.01)

(52) U.S. Cl.
CPC ...... *B01J 19/123* (2013.01); *B01J 2219/0869* (2013.01); *B01J 2219/1203* (2013.01); *B41M 7/0081* (2013.01)

(58) Field of Classification Search
CPC .............. B01J 19/123; B01J 2219/0869; B01J 2219/1203; B41M 7/0081
See application file for complete search history.

(56) References Cited

U.S. PATENT DOCUMENTS 6,507,031 B1 1/2003 Jinbo et al.
2002/0055666 A1* 5/2002 Hunter .................... A61P 35/00 604/27
(Continued)

FOREIGN PATENT DOCUMENTS

JP H4-301456 A 10/1992
JP 2000-009900 A 1/2000
(Continued)

OTHER PUBLICATIONS

International Preliminary Report on Patentability mailed Jul. 6, 2023 for PCT/JP2021/020023.

*Primary Examiner* — Nicole M Ippolito
(74) *Attorney, Agent, or Firm* — Faegre Drinker Biddle & Reath LLP

(57) ABSTRACT

An active energy irradiation device includes: an active energy irradiation unit having an emitting surface extending in both a first direction and a second direction, the emitting surface configured to emit an active energy ray to one side in a third direction; an inert gas supply unit having a spray port located on one side in the second direction with respect to the emitting surface, the spray port configured to spray an inert gas to the one side in the third direction; and a structure including a protrusion portion located on the other side in the second direction with respect to the emitting surface, the protrusion portion protruding to the one side in the third direction with respect to the emitting surface. A width in the second direction of the protrusion portion is larger than a width in the third direction of the protrusion portion.

12 Claims, 14 Drawing Sheets

(56) References Cited

U.S. PATENT DOCUMENTS

| | | | | |
|---|---|---|---|---|
| 2019/0263145 | A1 | 8/2019 | Rrahimi et al. | |
| 2023/0390438 | A1 * | 12/2023 | Lee | A61L 2/10 |

FOREIGN PATENT DOCUMENTS

| | | | | | |
|---|---|---|---|---|---|
| JP | 2001-113163 | A | | 4/2001 | |
| JP | 2005-125753 | A | | 5/2005 | |
| JP | 2006-326385 | A | | 12/2006 | |
| JP | 2008-221651 | A | | 9/2008 | |
| JP | 2011-009527 | A | | 1/2011 | |
| JP | 2021-035759 | A | | 3/2021 | |
| WO | WO-2015005412 | A1 | * | 1/2015 | H10K 59/8791 |
| WO | WO-2017/170949 | A1 | | 10/2017 | |
| WO | WO-2020013529 | A1 | * | 1/2020 | A61L 2/10 |
| WO | WO-2020/067158 | A1 | | 4/2020 | |

* cited by examiner

EXHAUST
UP
23
1
Z
Y
X
2a
61(6)
2c
12
5
51
52x(52)
7
IN-
TAKE
26
13
B
B
82
4
81
42
8
41
FRONT
REAR
25
92
2b
32
31
DOWN
83
3
91
93
9

ACTIVE ENERGY RADIATION DEVICE

TECHNICAL FIELD

The present disclosure relates to an active energy irradiation device.

BACKGROUND ART

An active energy irradiation device has been known that includes an active energy irradiation unit that irradiates an irradiation target with active energy rays, and an inert gas supply unit that supplies an inert gas to a region between the irradiation target and the active energy irradiation unit (for example, refer to Patent Literature 1). In such an active energy irradiation device, in order to prevent oxygen in the air from inhibiting an effect that occurs in the irradiation target due to irradiation with active energy rays, the inert gas is supplied to the region between the irradiation target and the active energy irradiation unit.

CITATION LIST

Patent Literature

Patent Literature 1: International Publication WO 2017/170949

SUMMARY OF INVENTION

Technical Problem

In the active energy irradiation device as described above, for example, when the conveying speed of the irradiation target is increased with respect to the active energy irradiation unit, oxygen is likely to be mixed into the region between the irradiation target and the active energy irradiation unit, and the effect that occurs in the irradiation target by irradiation with active energy rays is inhibited by the oxygen, which is a concern.

An object of the present disclosure is to provide an active energy irradiation device capable of suppressing the mixing of oxygen into a region between an irradiation target and an active energy irradiation unit.

Solution to Problem

According to one aspect of the present disclosure, there is provided an active energy irradiation device including: an active energy irradiation unit having an emitting surface extending in both a first direction and a second direction perpendicular to the first direction, the emitting surface configured to emit an active energy ray to one side in a third direction perpendicular to both the first direction and the second direction; an inert gas supply unit having a spray port located on one side in the second direction with respect to the emitting surface, he spray port configured to spray an inert gas to the one side in the third direction; and a structure including a protrusion portion located on the other side in the second direction with respect to the emitting surface, the protrusion portion protruding to the one side in the third direction with respect to the emitting surface. A width in the second direction of the protrusion portion is larger than a width in the third direction of the protrusion portion.

In this active energy irradiation device, when an irradiation target is conveyed from the one side in the second direction to the other side in the second direction with respect to the emitting surface of the active energy irradiation unit, the inert gas sprayed from the spray port of the inert gas supply unit is supplied to a region between the irradiation target and the active energy irradiation unit. At this time, since the protrusion portion in which the width in the second direction is larger than the width in the third direction is located on the other side in the second direction with respect to the emitting surface of the active energy irradiation unit, it becomes difficult for the inert gas to flow out of the region between the irradiation target and the active energy irradiation unit to a downstream side (the other side in the second direction) in a conveying direction of the irradiation target. Therefore, according to this active energy irradiation device, the mixing of oxygen into the region between the irradiation target and the active energy irradiation unit can be suppressed.

In the active energy irradiation device according to one aspect of the present disclosure, the inert gas supply unit may include a spray portion provided with the spray port, the spray portion protruding to the one side in the third direction with respect to the emitting surface. Accordingly, it becomes difficult for air to flow from an upstream side (one side in the second direction) in the conveying direction of the irradiation target into the region between the irradiation target and the active energy irradiation unit. Therefore, the mixing of oxygen into the region between the irradiation target and the active energy irradiation unit can be more reliably suppressed.

In the active energy irradiation device according to one aspect of the present disclosure, a width in the third direction of the spray portion may be larger than the width in the third direction of the protrusion portion. Accordingly, the spray port of the inert gas supply unit is close to the irradiation target, so that it becomes difficult for air to flow from the upstream side in the conveying direction of the irradiation target into the region between the irradiation target and the active energy irradiation unit. Therefore, the mixing of oxygen into the region between the irradiation target and the active energy irradiation unit can be more reliably suppressed.

The active energy irradiation device according to one aspect of the present disclosure may further include a support body supporting the active energy irradiation unit, the inert gas supply unit, and the structure. Each of a width in the first direction of the active energy irradiation unit, a width in the first direction of the inert gas supply unit, and a width in the first direction of the structure may be less than or equal to a width in the first direction of the support body. Accordingly, a plurality of the active energy irradiation devices can be arranged such that the support bodies come into contact with each other in the first direction, and can correspond to the irradiation target with a wide width in the first direction.

In the active energy irradiation device according to one aspect of the present disclosure, each of a width in the first direction of the spray port and a width in the first direction of the protrusion portion may be equal to a width in the first direction of the emitting surface. Accordingly, in the plurality of active energy irradiation devices arranged such that the support bodies come into contact with each other in the first direction, the irradiation target with a wide width in the first direction can be uniformly irradiated with the active energy ray while suppressing the mixing of oxygen into the regions between the irradiation target and a plurality of the active energy irradiation units.

In the active energy irradiation device according to one aspect of the present disclosure, the structure may be detachably attached to the support body. Accordingly, the replacement and maintenance of the structure can be easily performed.

In the active energy irradiation device according to one aspect of the present disclosure, at least the protrusion portion may have a surface configured to absorb the active energy ray. Accordingly, it can be prevented that the active energy ray is reflected by the protrusion portion and undesired locations are irradiated with the active energy ray.

In the active energy irradiation device according to one aspect of the present disclosure, the structure may include a box body or a block body. Accordingly, the flowing of the inert gas out of the region between the irradiation target and the active energy irradiation unit to the downstream side in the conveying direction of the irradiation target can be suppressed.

In the active energy irradiation device according to one aspect of the present disclosure, the structure may include a plurality of plate bodies. Accordingly, the flowing of the inert gas out of the region between the irradiation target and the active energy irradiation unit to the downstream side in the conveying direction of the irradiation target can be suppressed.

In the active energy irradiation device according to one aspect of the present disclosure, the structure may have a suction port configured to suction the inert gas. Accordingly, the inert gas supplied to the region between the irradiation target and the active energy irradiation unit can be efficiently recovered.

The active energy irradiation device according to one aspect of the present disclosure may further include a pair of shielding plates disposed on one side and the other side in the first direction with respect to the emitting surface. Accordingly, it becomes difficult for the inert gas to flow out of the region between the irradiation target and the active energy irradiation unit to the one side and the other side in the first direction. Therefore, the mixing of oxygen into the region between the irradiation target and the active energy irradiation unit can be more reliably suppressed.

In the active energy irradiation device according to one aspect of the present disclosure, the active energy irradiation unit may emit an ultraviolet ray or an electron beam as the active energy ray. Accordingly, the active energy irradiation device can be used as a device that irradiates the irradiation target with an ultraviolet ray or an electron beam.

Advantageous Effects of Invention

According to the present disclosure, it is possible to provide the active energy irradiation device capable of suppressing the mixing of oxygen into a region between the irradiation target and the active energy irradiation unit.

DESCRIPTION OF EMBODIMENTS

Figure 1:
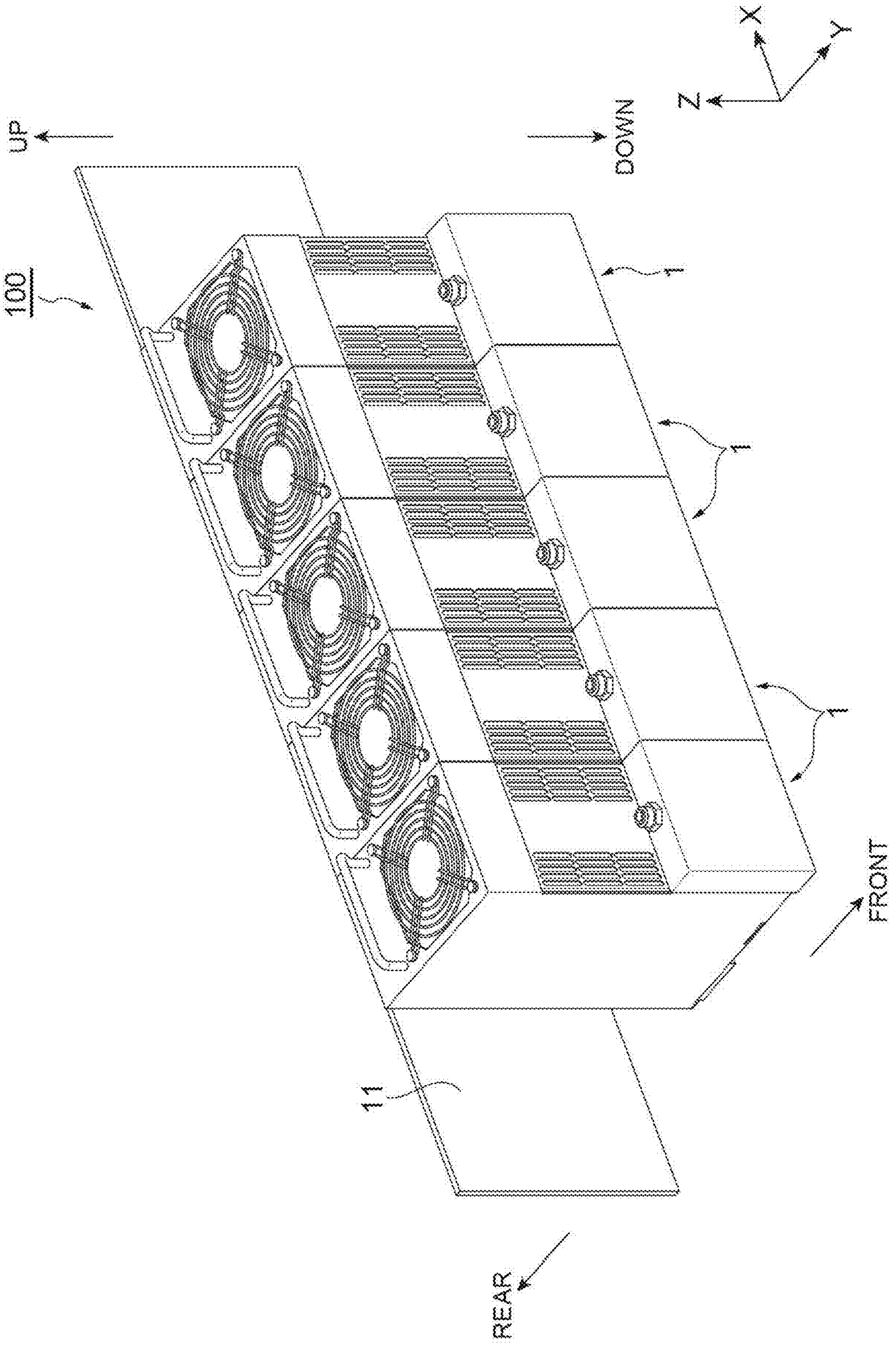
FIG. 1 is a perspective view of an active energy irradiation system according to one embodiment.
Figure 2:
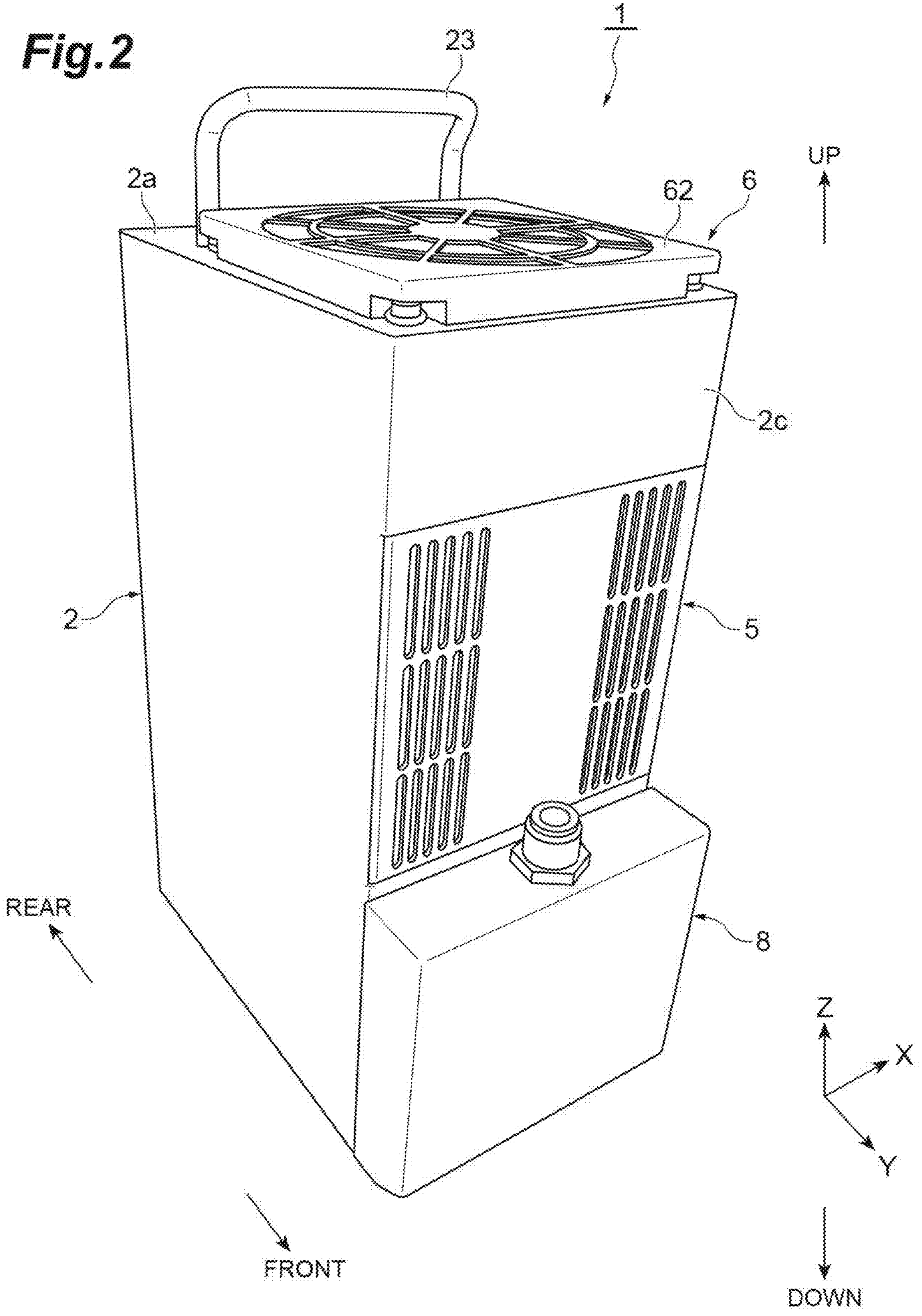
FIG. 2 is a perspective view of an active energy irradiation device illustrated in FIG. 1.

Hereinafter, an embodiment of the present disclosure will be described in detail with reference to the drawings. It should be noted that in the drawings, the same or equivalent portions are denoted by the same reference signs, and duplicate descriptions will be omitted.

As illustrated in FIG. 1, an active energy irradiation system 100 is, for example, a system that is installed in an ultraviolet (UV) printer, and includes a plurality of active energy irradiation devices 1. The active energy irradiation devices 1 are, for example, high-output air-cooled LED light sources for printing applications. The active energy irradiation devices 1 irradiate an irradiation target with ultraviolet rays (active energy rays) to dry ink on the irradiation target. Examples of the irradiation target include a printed matter to which a photocurable ink is adhered.

The active energy irradiation devices 1 have a rectangular parallelepiped outer shape. The active energy irradiation devices 1 are arranged to be in contact with each other in a predetermined direction. The plurality of active energy irradiation devices 1 arranged in the predetermined direction are fixed and held by a fixing plate 11. In the illustrated example, the active energy irradiation system 100 includes a unit including the plurality of active energy irradiation devices 1 fixed to the fixing plate 11. As illustrated in FIGS. 2, 3, 4, and 5, the active energy irradiation device 1 includes a housing (support body) 2, an active energy irradiation unit 3, a heatsink 4, an intake unit 5, an exhaust unit 6, a duct 7, an inert gas supply unit 8, and an inert gas suction unit (structure) 9.

Incidentally, for convenience of description, the predetermined direction in which the plurality of active energy irradiation devices 1 are arranged is defined as an "X direction" (first direction), a direction perpendicular to the X direction, which is an emission direction of ultraviolet rays from the active energy irradiation devices 1, is defined as a "Z direction" (third direction perpendicular to both the first direction and a second direction), and a direction orthogonal to the X direction and the Z direction is defined as a "Y direction" (second direction perpendicular to the first direction). A side of the active energy irradiation device 1 from which ultraviolet rays are emitted is defined as a "lower side" (one side in the Z direction), and the opposite side is defined as an "upper side". One side in the Y direction is defined as a "front side", and the other side in the Y direction is defined as a "rear side".

The housing 2 has a rectangular shape that is elongated in the Z direction. The housing 2 is made of metal. The housing 2 houses and supports the active energy irradiation unit 3, the heatsink 4, and the duct 7. The housing 2 is configured by assembling a front casing 21 and a rear casing 22 to each other. A grip portion 23 for grasping the housing 2 is provided on an upper wall 2*a* of the housing 2. A driver substrate 12 with the Y direction as a thickness direction is disposed on the rear side inside the housing 2. The driver substrate 12 is an electrical driving circuit substrate for driving the active energy irradiation device 1. A driver substrate heatsink 13 that cools transistors and the like of the driver substrate 12 is disposed on the driver substrate 12. The driver substrate heatsink 13 is thermally connected to the transistors and the like of the driver substrate 12.

The active energy irradiation unit 3 includes a substrate 31 having a rectangular plate shape and constituting a predetermined circuit, and LED elements 32 that are light-emitting elements arranged at predetermined pitches in the X direction and the Y direction on the substrate 31. The LED elements 32 emit ultraviolet rays downward. The active energy irradiation unit 3 is disposed at a lower end portion inside the housing 2 with the Z direction as a thickness direction of the substrate 31. A plurality of the substrates 31 are arranged in the X direction. Accordingly, several to several hundred LED elements 32 are arranged in the X direction and the Y direction inside the housing 2. The irradiation target moving in the Y direction is irradiated with ultraviolet rays emitted from each of the LED elements 32 of the active energy irradiation unit 3 through a light irradiation window 24 made of a glass plate and provided on a lower wall 2*b* of the housing 2. Incidentally, the plurality of substrates 31 may be arranged in the X direction and the Y direction.

The heatsink 4 is a heat radiation member thermally connected to the LED elements 32 of the active energy irradiation unit 3. The heatsink 4 is an air-cooled heatsink that radiates heat through heat exchange with air. Air constitutes a heat transfer medium (coolant) for cooling the LED elements 32. The heatsink 4 includes a base plate 41, heat radiation fins 42, a heat pipe 43, and a partition plate (partition member) 44.

The base plate 41 has a rectangular plate shape. The active energy irradiation unit 3 is provided on a lower surface of the base plate 41. The lower surface of the base plate 41 is in contact with the substrate 31 of the active energy irradiation unit 3. The heat radiation fins 42 have a flat plate shape with the Y direction as a thickness direction. The heat radiation fins 42 are erected on an upper surface (surface) of the base plate 41. The heat radiation fins 42 are arranged to be stacked with gaps therebetween in the Y direction.

The heat pipe 43 is provided to be embedded in a plurality of the heat radiation fins 42. The heat pipe 43 is thermally connected to the plurality of heat radiation fins 42. The partition plate 44 is provided to intersect the plurality of heat radiation fins 42. The partition plate 44 has a flat plate shape with the X direction as a thickness direction. The partition plate 44 partitions the plurality of heat radiation fins 42 in the X direction. A pair of the partition plates 44 are provided spaced from each other in the X direction on the plurality of heat radiation fins 42. The pair of partition plates 44 partition the plurality of heat radiation fins 42 into a pair of outer portions 42*x* located outside in the X direction and an inner portion 42*y* located between the pair of outer portions.

Ends on a base plate 41 side of the partition plates 44 are spaced apart from the base plate 41. Namely, the partition plates 44 partition the plurality of heat radiation fins 42 such that more air passes through in the X direction between the plurality of heat radiation fins 42 on the lower side (base plate 41 side) than on the upper side (side opposite to the base plate 41 side). The partition plates 44 are brazed and fixed to the plurality of heat radiation fins 42. The heatsink 4 is attached to the housing 2 through a bracket 25 and a support frame 26 (refer to FIG. 7). The intake unit 5 introduces air from outside the housing 2 into the housing 2. The intake unit 5 introduces the air into a buffer space BF to be described later inside the housing 2. The intake unit 5 is provided on a portion toward an upper side of the center of a wall portion 2*c* on the front side of the housing 2. The intake unit 5 includes an intake filter (filter unit) 51, a filter holding portion 52, and intake ports 53.

As illustrated in FIGS. 4, 5, 6, and 7, the intake filter 51 captures foreign matter (dust and the like) contained in the air introduced into the housing 2. The intake filter 51 is made of, for example, urethane or the like. The intake filter 51 has a rectangular plate-shaped outer shape. The intake filter 51 extends over the portion toward the upper side of the center of the wall portion 2*c* when viewed from the front. The filter holding portion 52 houses and holds the intake filter 51. The filter holding portion 52 includes an outer plate 52*x* having a rectangular plate shape with the Y direction as a thickness direction. A front surface of the outer plate 52*x* is located on the same plane as a front surface of the wall portion 2*c* of the housing 2. The filter holding portion 52 is detachably attached to the duct 7 and the support frame 27 provided on the duct 7.

The intake ports 53 are through-holes that are open along the Y direction (direction intersecting a direction from the heatsink 4 toward the exhaust unit 6), and that communicate with the inside of the housing 2. The intake ports 53 are arranged in proximity to each other in regions at both end portions in the X direction of the outer plate 52*x*. The intake ports 53 are through-holes having an elongated hole shape with the Z direction as a longitudinal direction. Air suctioned from the intake ports 53 is introduced into the buffer space BF inside the housing 2 through the intake filter 51 (refer to FIG. 8).

The exhaust unit 6 discharges the air from inside the housing 2 to the outside of the housing 2. The exhaust unit 6 is provided on an upper end portion of the housing 2. The exhaust unit 6 includes a fan 61. For example, an axial fan is used as the fan 61. The fan 61 delivers the air, which is suctioned from the lower side along the Z direction, to the upper side under pressure along the Z direction. The fan 61 is fixed to an upper end portion inside the housing 2. An exhaust filter 62 made of, for example, urethane or the like is attached to the upper wall 2*a* of the housing 2 located on a discharge side of the fan 61. Incidentally, the exhaust filter 62 is illustrated only in the FIG. 2 for the sake of convenience, and the illustration in the other drawings is omitted. For example, an external pipe for outdoor exhaust (not illustrated) is connected to the discharge side of the fan 61 of the exhaust unit 6.

The duct 7 is provided between the heatsink 4 and the exhaust unit 6 inside the housing 2. The duct 7 allows the air, which has passed through the heatsink 4, to flow through to the exhaust unit 6. The duct 7 allows an inert gas, which has passed through the heatsink 4, to flow through to the exhaust unit 6. The duct 7 has a rectangular pipe shape. The duct 7 includes a linear portion 71 extending in the Z direction with a constant cross-sectional area, and an enlarged portion 72 provided on a downstream side of the linear portion 71 and extending in the Z direction such that the cross-sectional area increases as the enlarged portion 72 extends downstream.

The buffer space BF (refer to FIG. 8) that is a space into which air is introduced from outside by the intake unit 5 is provided on one side and the other side in the X direction of the duct 7 inside the housing 2. The buffer space BF is a space defined by inner surfaces of the housing 2 and outer surfaces of the linear portion 71 and the enlarged portion 72 of the duct 7. Lower end portions of the duct 7 are inserted and fixed to grooves 47 formed in the heat radiation fins 42 of the heatsink 4. An upper end portion of the duct 7 is fixed to a suction side of the fan 61. The duct 7 is attached to the housing 2 through the support frame 27.

As illustrated in FIGS. 2, 3, 4, and 5, the inert gas supply unit 8 supplies inert gas to the outside of the housing 2. Examples of the inert gas include nitrogen. The inert gas supply unit 8 forms a region, which is dominated by the inert gas (region with low oxygen concentration), in a region including an irradiation region of ultraviolet rays from the plurality of LED elements 32, by supplying the inert gas. The inert gas supply unit 8 is attached to a lower end portion of the wall portion 2*c* on the front side of the housing 2. The inert gas supply unit 8 includes a purge housing 81 having a rectangular box shape; a socket 82 provided on an upper end surface of the purge housing 81; and a spray port 83 provided at a lower end portion of the purge housing 81. In the inert gas supply unit 8, the inert gas is introduced from the socket 82 into the purge housing 81, and the inert gas is sprayed from the spray port 83.

The inert gas suction unit 9 suctions the inert gas outside the housing 2, and causes the inert gas to flow into the housing 2. The inert gas suction unit 9 is a structure attached to the housing 2. The inert gas suction unit 9 is detachably attached to a rear side of the lower wall 2*b* of the housing 2 by fasteners such as screws. The inert gas suction unit 9 includes a suction unit housing 91 having a rectangular box shape; a suction port 92 provided in a lower surface of the suction unit housing 91; and a recovery flow path 93 provided inside the suction unit housing 91 (refer to FIG. 7). In the inert gas suction unit 9, the inert gas is suctioned into the suction unit housing 91 through the suction port 92, and the inert gas is allowed to flow through the recovery flow path 93 into the housing 2.

Figure 6:
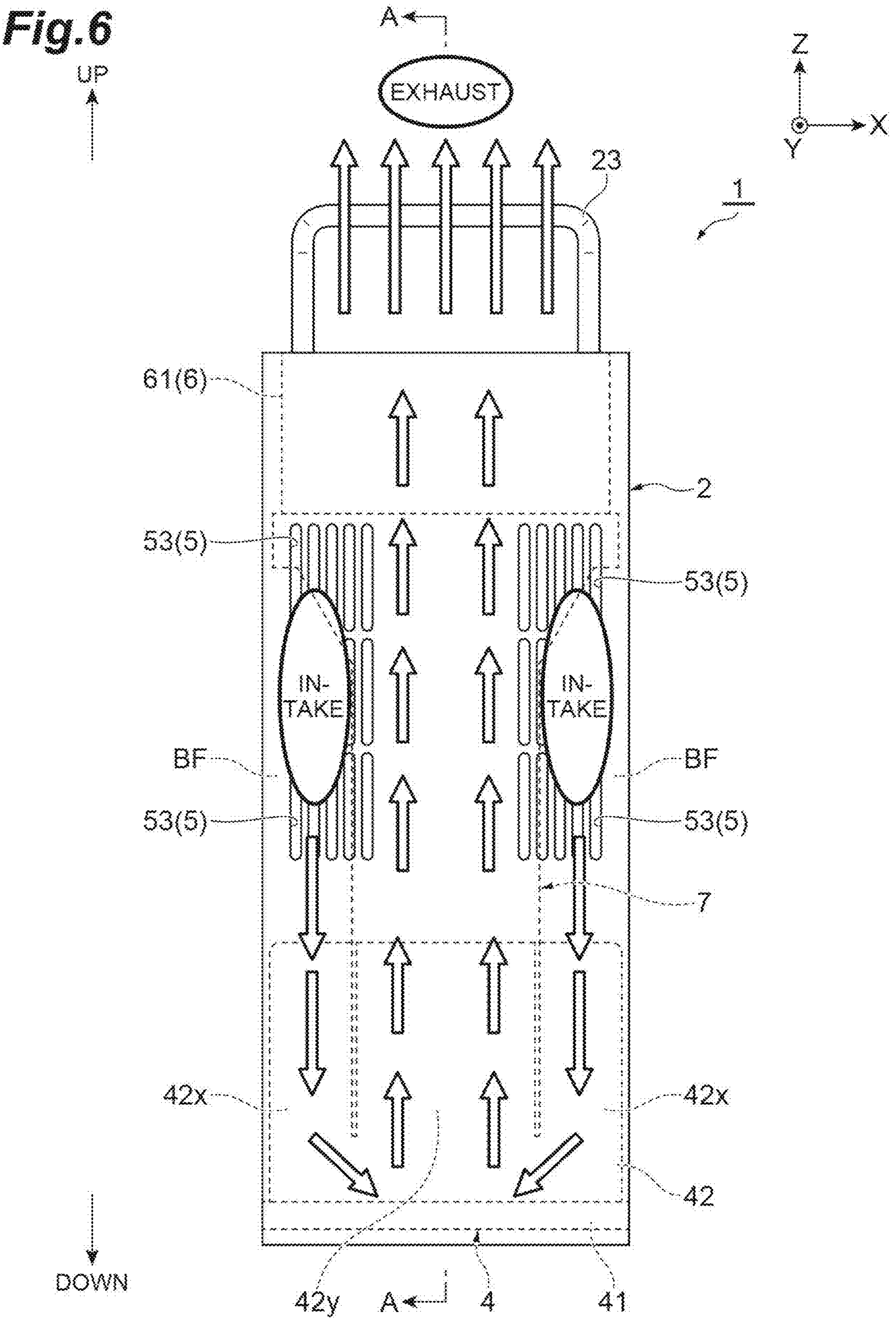
FIG. 6 is a front view illustrating the flows of air in the active energy irradiation device illustrated in FIG. 2.
Figure 7:
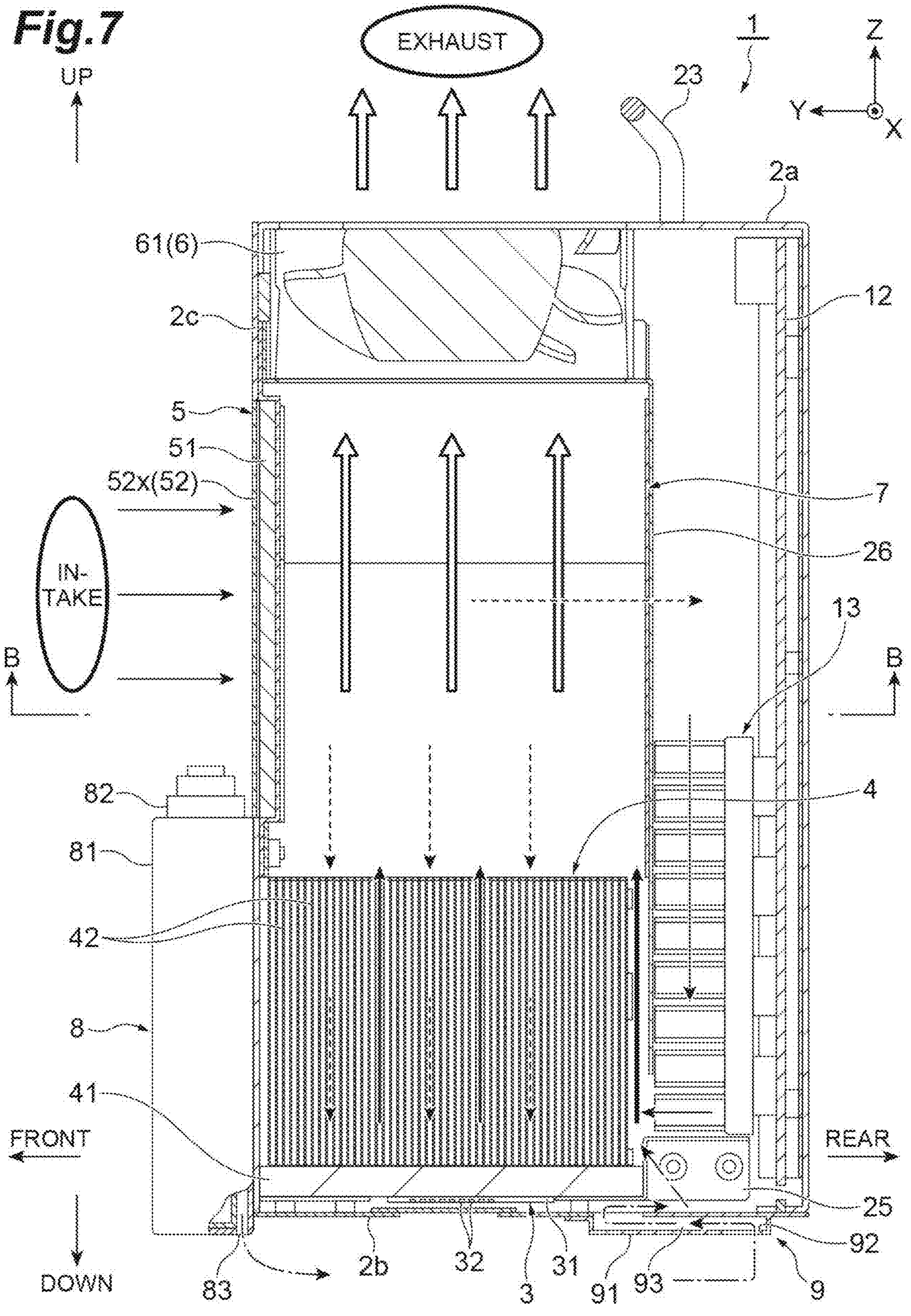
FIG. 7 is a cross-sectional view of the active energy irradiation device taken along line A-A illustrated in FIG. 6.
Figure 8:
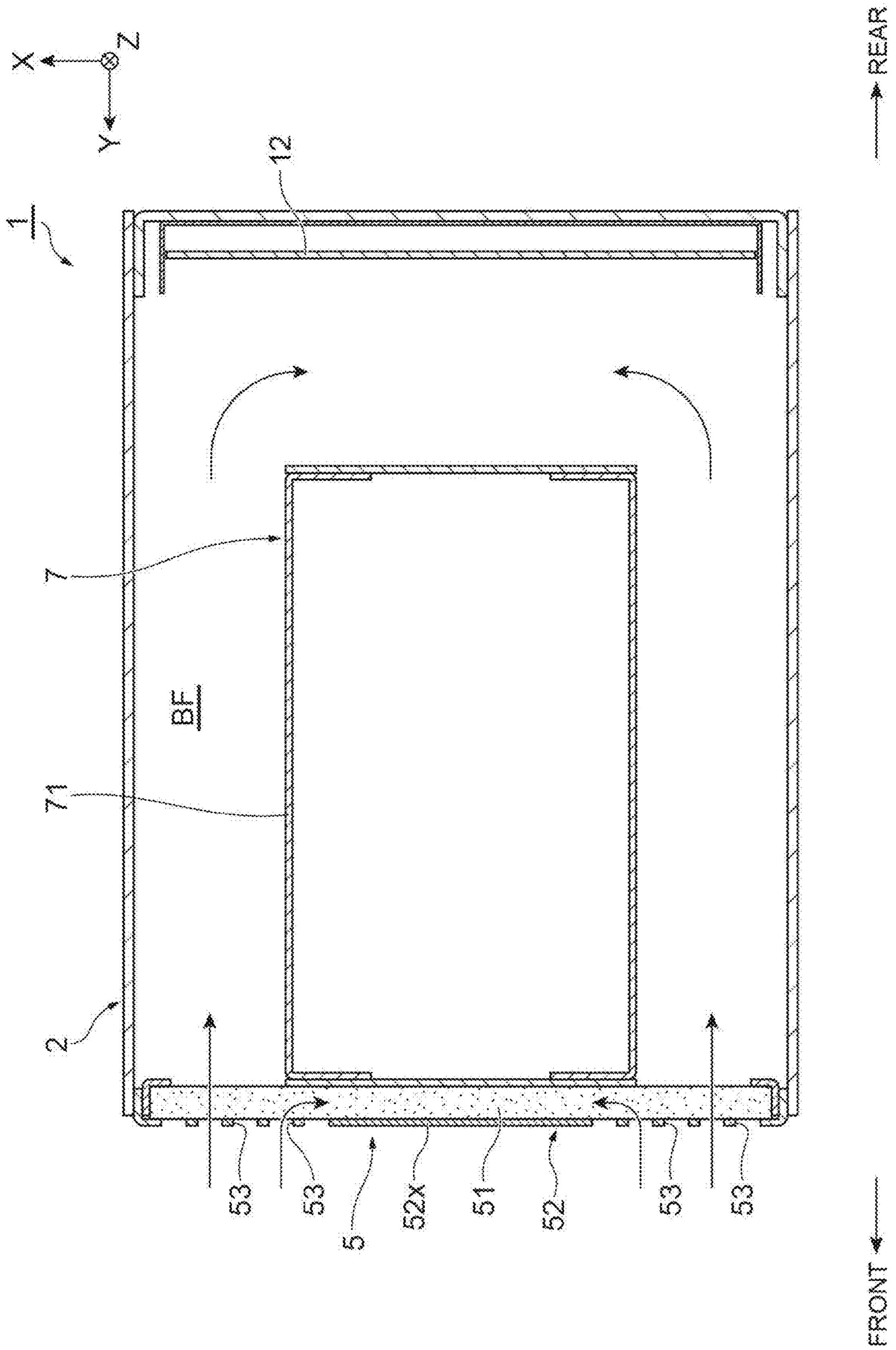
FIG. 8 is an end view of the active energy irradiation device taken along line B-B illustrated in FIG. 7.

As illustrated in FIGS. 6, 7, and 8, in the active energy irradiation device 1, outside air is introduced into the buffer space BF inside the housing 2 by the intake unit 5. The air introduced into the buffer space BF flows downward along the Z direction, and then passes through the heatsink 4 and flows into the duct 7. At this time, in the heatsink 4, the air flows downward along the Z direction between the plurality of heat radiation fins 42 of each of the pair of outer portions 42*x*, and then flows to pass through between the partition plates 44 and the base plate 41 and to turn upward, and merges at the inner portion 42*y*. Then, the air flows upward along the Z direction between the plurality of heat radiation fins 42 of the inner portion 42*y*, and flows into the duct 7.

In addition, the air introduced into the buffer space BF flows downward along the Z direction, and then passes through the driver substrate heatsink 13. The air that has passed through the driver substrate heatsink 13 merges with the flow in the inner portion 42*y* of the heatsink 4 through a lower rear space inside the housing 2, flows upward along the Z direction between the plurality of heat radiation fins 42 of the inner portion 42*y*, and flows into the duct 7. The air that has flowed into the duct 7 flows upward along the Z direction, and is discharged to the outside of the housing 2 through the fan 61.

As illustrated in FIG. 7, in the active energy irradiation device 1, the inert gas sprayed from the inert gas supply unit 8 is suctioned by the inert gas suction unit 9, and flows into the housing 2. The inert gas that has flowed into the housing 2 merges with the flow in the inner portion 42*y* of the heatsink 4 through the lower rear space inside the housing 2, flows upward along the Z direction between the plurality of heat radiation fins 42 of the inner portion 42*y*, together with the air, and flows into the duct 7. The inert gas that has flowed into the duct 7 flows upward along the Z direction, together with the air, and is discharged to the outside of the housing 2 through the fan 61, together with the air.

A configuration of the inert gas supply unit 8 will be described in more detail with reference to FIGS. 9 and 10.

Figure 9:
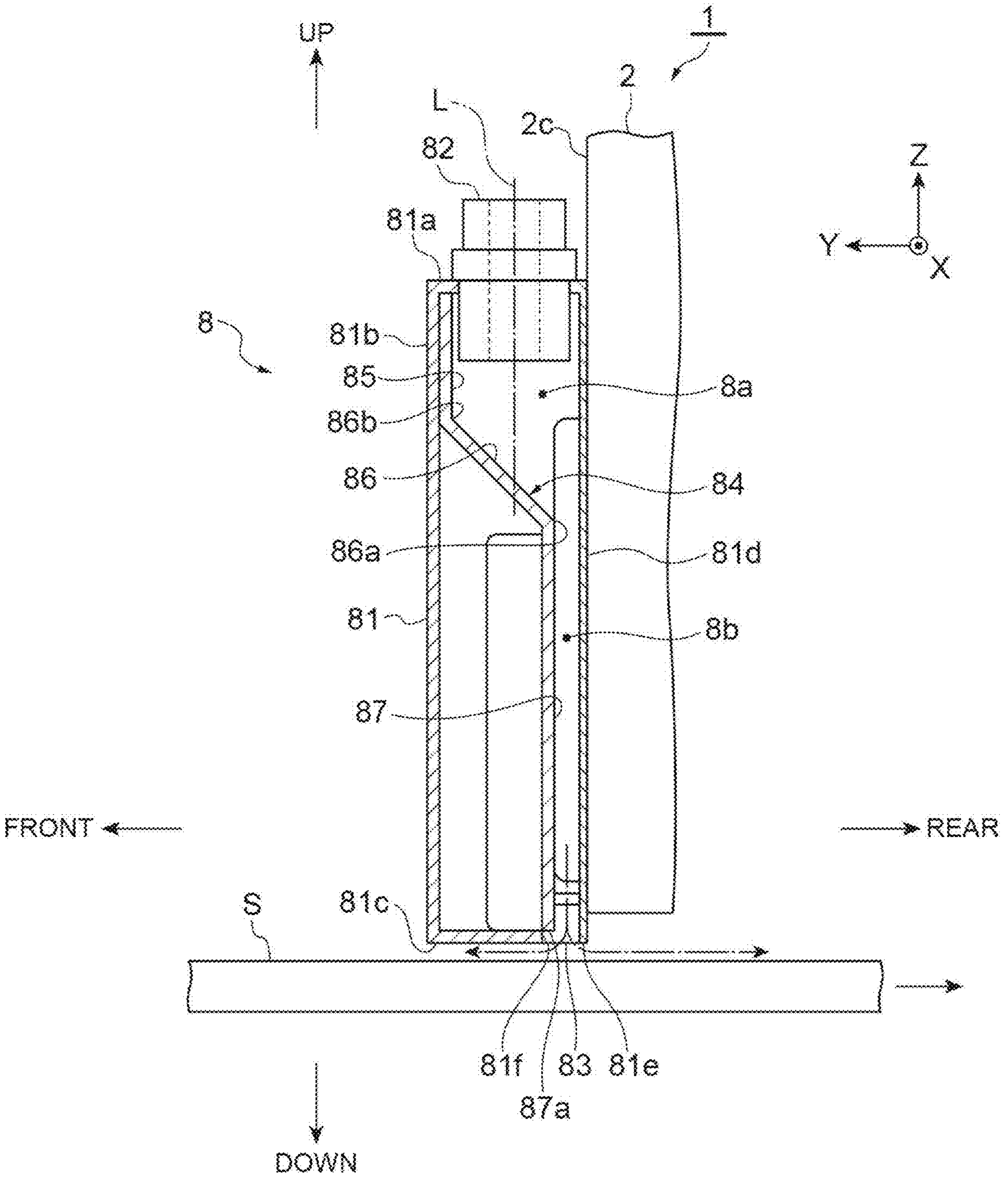
FIG. 9 is a cross-sectional view of an inert gas supply unit of the active energy irradiation device illustrated in FIG. 1.
Figure 10:
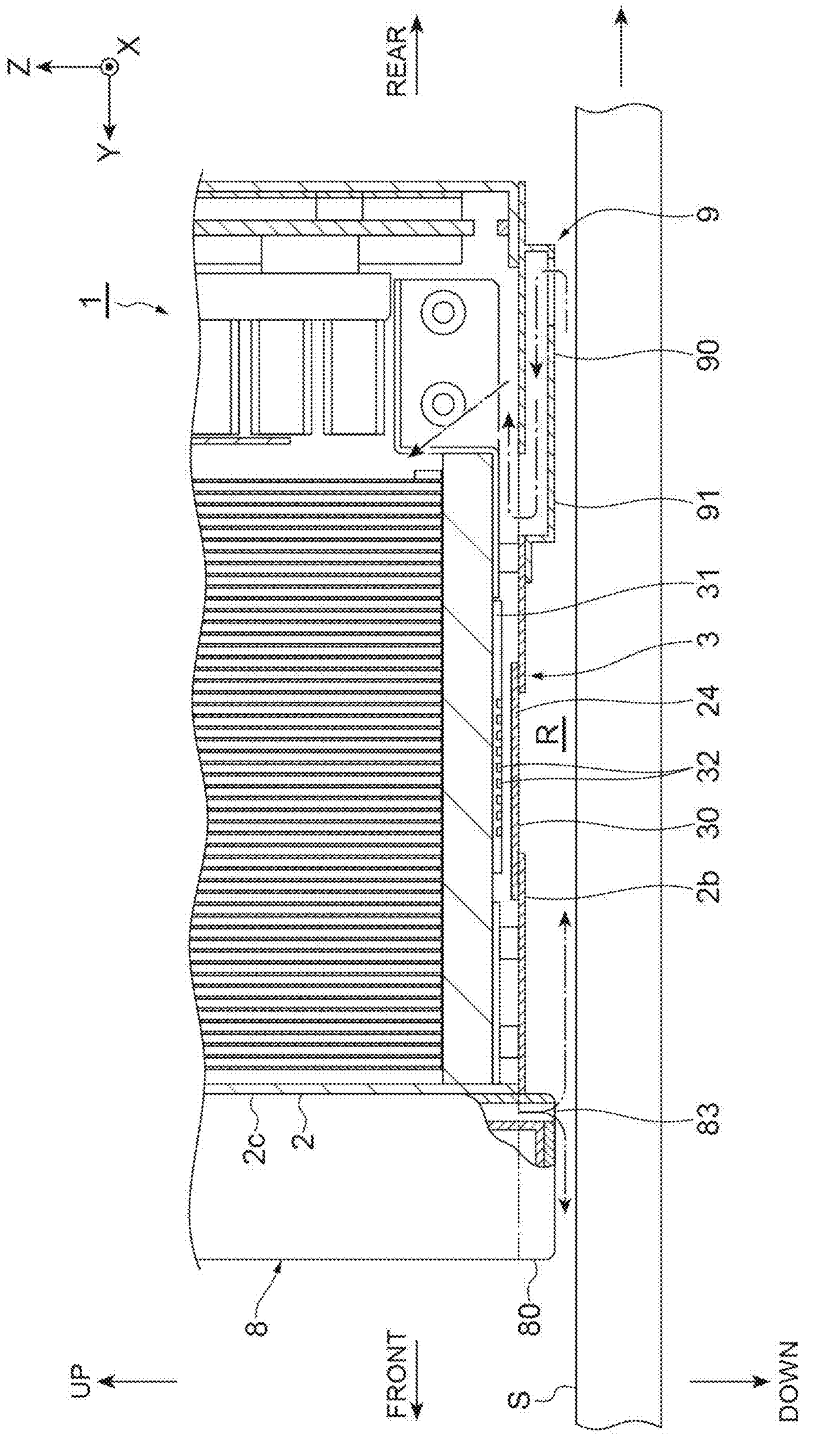
FIG. 10 is a partial cross-sectional view of the active energy irradiation device illustrated in FIG. 1.

As illustrated in FIGS. 9 and 10, the inert gas supply unit 8 supplies the inert gas to a region R between the active energy irradiation unit 3 and an irradiation target S conveyed from the front side to the rear side by a conveyor (not illustrated), by spraying the inert gas (alternate long and short dashed lines illustrated in FIGS. 9 and 10) onto the irradiation target S. The reason for supplying the inert gas to the region R is to prevent oxygen in the air from inhibiting an effect that occurs in the irradiation target S due to the irradiation with the ultraviolet rays emitted from the active energy irradiation unit 3.

As one example, the irradiation target S is a printed matter to which a photocurable ink is adhered. The ink is ejected onto the irradiation target S from an ink head (not illustrated) on an upstream side (front side) of the active energy irradiation device 1, and is cured by irradiation with ultraviolet rays emitted from the active energy irradiation unit 3. At this time, in order to prevent oxygen in the air from inhibiting the curing of the ink, the inert gas supply unit 8 supplies the inert gas to the region R between the irradiation target S and the active energy irradiation unit 3.

As illustrated in FIG. 9, the inert gas supply unit 8 includes a rectifying plate 84 inside the purge housing 81. The socket 82 is provided on a purge upper surface 81*a* of the purge housing 81. The rectifying plate 84 is fixed to a purge front surface 81*b* of the purge housing 81. The rectifying plate 84 includes a first vertical surface 85, an inclined surface 86, and a second vertical surface 87. A purge bottom surface 81*c* of the purge housing 81 forms a part of the spray port 83. A purge back surface 81*d* of the purge housing 81 is in contact with the front surface of the wall portion 2*c* of the housing 2. The rectifying plate 84 forms a flow path through which the inert gas passes, in cooperation with the purge housing 81.

The inert gas supply unit 8 includes a first flow path portion 8*a* and a second flow path portion 8*b*. The inert gas received from the socket 82 passes through the first flow path portion 8*a*, and then passes through the second flow path portion 8*b*, and is finally sprayed from the spray port 83.

The first flow path portion 8*a* receives the inert gas from the socket 82, and provides the inert gas to the second flow path portion 8*b*. The first flow path portion 8*a* is a region surrounded by the purge upper surface 81*a*, the first vertical surface 85, the inclined surface 86, and the purge back surface 81*d*. The first flow path portion 8*a* includes a portion that is reduced in flow path area along a direction in which the inert gas flows. Specifically, the first flow path portion 8*a* includes a portion between the first vertical surface 85 and the purge back surface 81*d* and a portion between the inclined surface 86 and the purge back surface 81*d*. The distance between the first vertical surface 85 and the purge back surface 81*d* is constant. Therefore, the flow path area is constant. On the other hand, the inclined surface 86 is inclined with respect to the Z direction. In other words, a lower side 86*a* of the inclined surface 86 is located behind an upper side 86*b* of the inclined surface 86 in the Y direction. Accordingly, the flow path area is gradually reduced as the inclined surface 86 approaches the second flow path portion 8*b*.

The socket 82 is provided on the purge upper surface 81*a* such that an axis L of the socket 82 is located substantially at the center between the purge front surface 81*b* and the purge back surface 81*d*. Namely, the axis L of the socket 82 intersects the inclined surface 86. In other words, the axis L of the socket 82 is located between the lower side 86*a* and the upper side 86*b* of the inclined surface 86 in the Y direction. Accordingly, the flow of the inert gas received from the socket 82 collides with the inclined surface 86. Then, the inert gas flows rearward in the Y direction along the inclined surface 86, and reaches the second flow path portion 8*b*.

The second flow path portion 8*b* receives the inert gas from the first flow path portion 8*a*, and provides the inert gas to the spray port 83. In other words, the second flow path portion 8*b* guides the inert gas to an irradiation target S side along the Z direction. The second flow path portion 8*b* is a region surrounded by the second vertical surface 87 and the purge back surface 81*d*. A region between an upper side of the second vertical surface 87 (namely, the lower side 86*a* of the inclined surface 86) and the purge back surface 81*d* receives the compressed inert gas. The distance between the second vertical surface 87 and the purge back surface 81*d* is constant. Namely, the flow path area of the second flow path portion 8*b* is constant. The flow path area of the second flow path portion 8*b* is smaller than a flow path area of a portion of the first flow path portion 8*a* between the first vertical surface 85 and the purge back surface 81*d*. The flow path area of the second flow path portion 8*b* is the same as a flow path area of a portion of the first flow path portion 8*a* between the lower side 86*a* of the inclined surface 86 and the purge back surface 81*d*.

A terminal of the second flow path portion 8*b* corresponds to the spray port 83. The spray port 83 is formed between a lower end 87*a* of the second vertical surface 87 and a lower end 81*e* of the purge back surface 81*d*. A rear end 81*f* of the purge bottom surface 81*c* may constitute a part of the spray port 83. The inert gas sprayed from the spray port 83 onto the irradiation target S collides with the irradiation target S, and then changes the flow direction. Some of the inert gas flows rearward and is supplied to the region R between the irradiation target S and the active energy irradiation unit 3 (refer to FIG. 10). Another portion of the inert gas flows forward and suppresses the flowing of air into the region R between the irradiation target S and the active energy irradiation unit 3 (refer to FIG. 10).

In the inert gas supply unit 8 configured as described above, the flow path area of the first flow path portion 8*a* is larger than the flow path area of each of the socket 82 and the second flow path portion 8*b*, and the rectifying plate 84 disposed to intersect the axis L of the socket 82 in the first flow path portion 8*a* hinders the flow of the inert gas received from the socket 82. Accordingly, the flow of the inert gas received from the socket 82 spreads out in the X direction, and as a result, the distribution of the flow rate of the inert gas sprayed from the spray port 83 is made uniform in the X direction. Therefore, the inert gas can be efficiently supplied to the region R between the irradiation target S and the active energy irradiation unit 3 (refer to FIG. 10). Further, the rectifying plate 84 has the inclined surface 86 as a surface that hinders the flow of the inert gas. Namely, the rectifying plate 84 realizes a flow path configuration in which the flow path area is gradually reduced. Accordingly, the operating noise of the inert gas supply unit 8 can be reduced.

The housing 2, the active energy irradiation unit 3, the inert gas supply unit 8, and the inert gas suction unit 9 will be described in more detail with reference to FIGS. 3 and 10.

Figure 3:
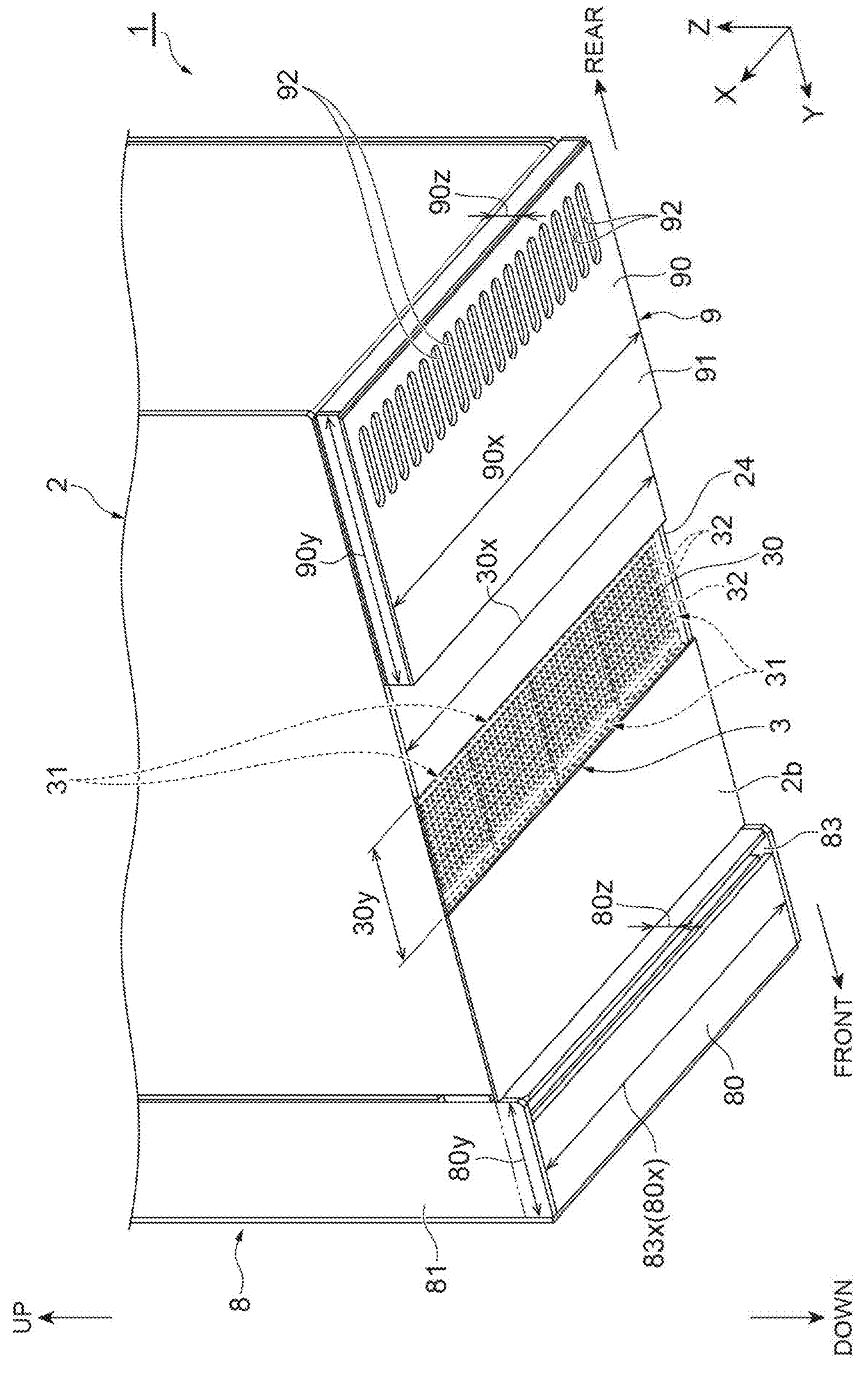
FIG. 3 is a perspective view of the active energy irradiation device illustrated in FIG. 2 when viewed from below.
Figure 4:
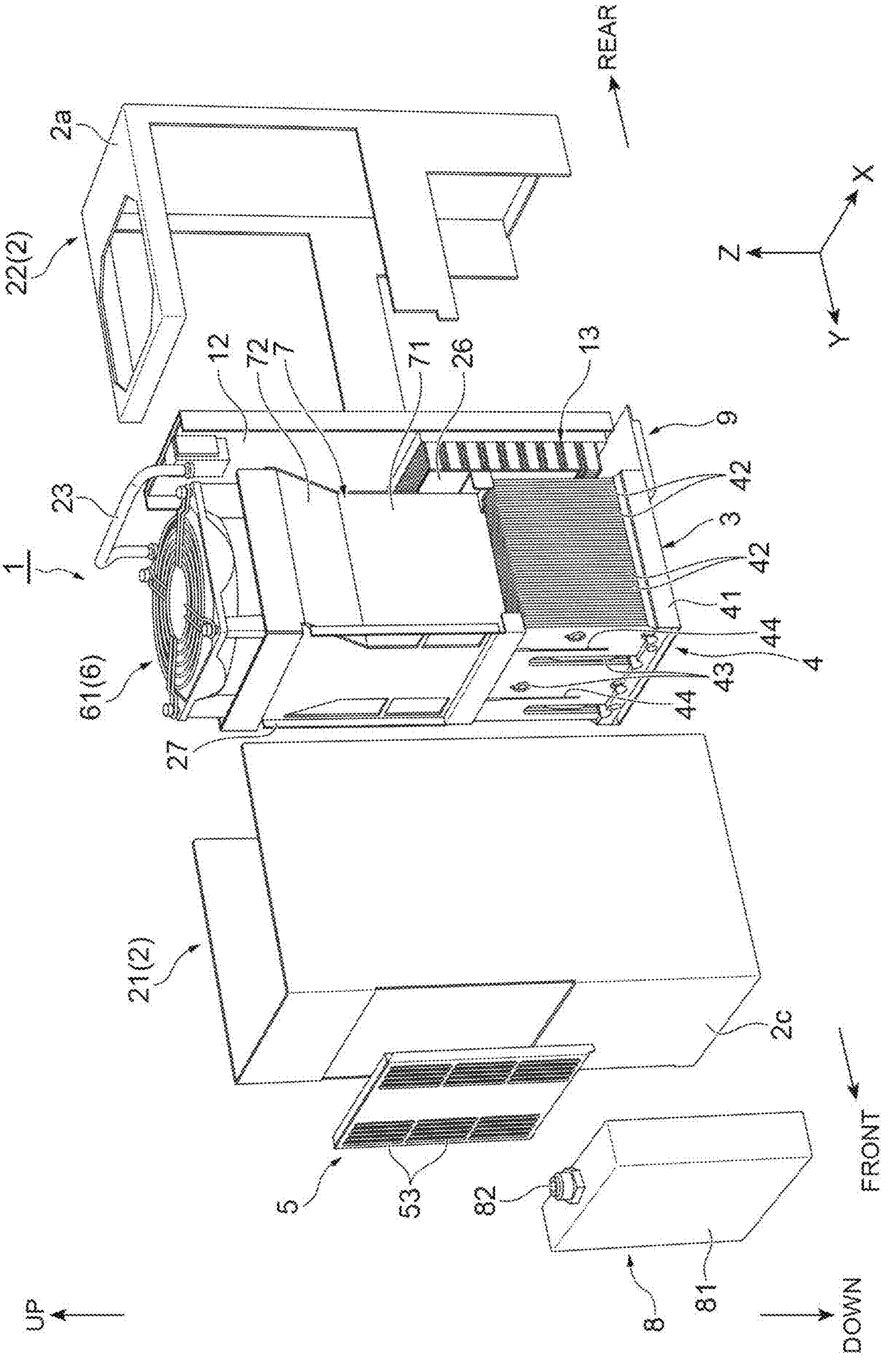
FIG. 4 is an exploded perspective view of the active energy irradiation device illustrated in FIG. 2.
Figure 5:
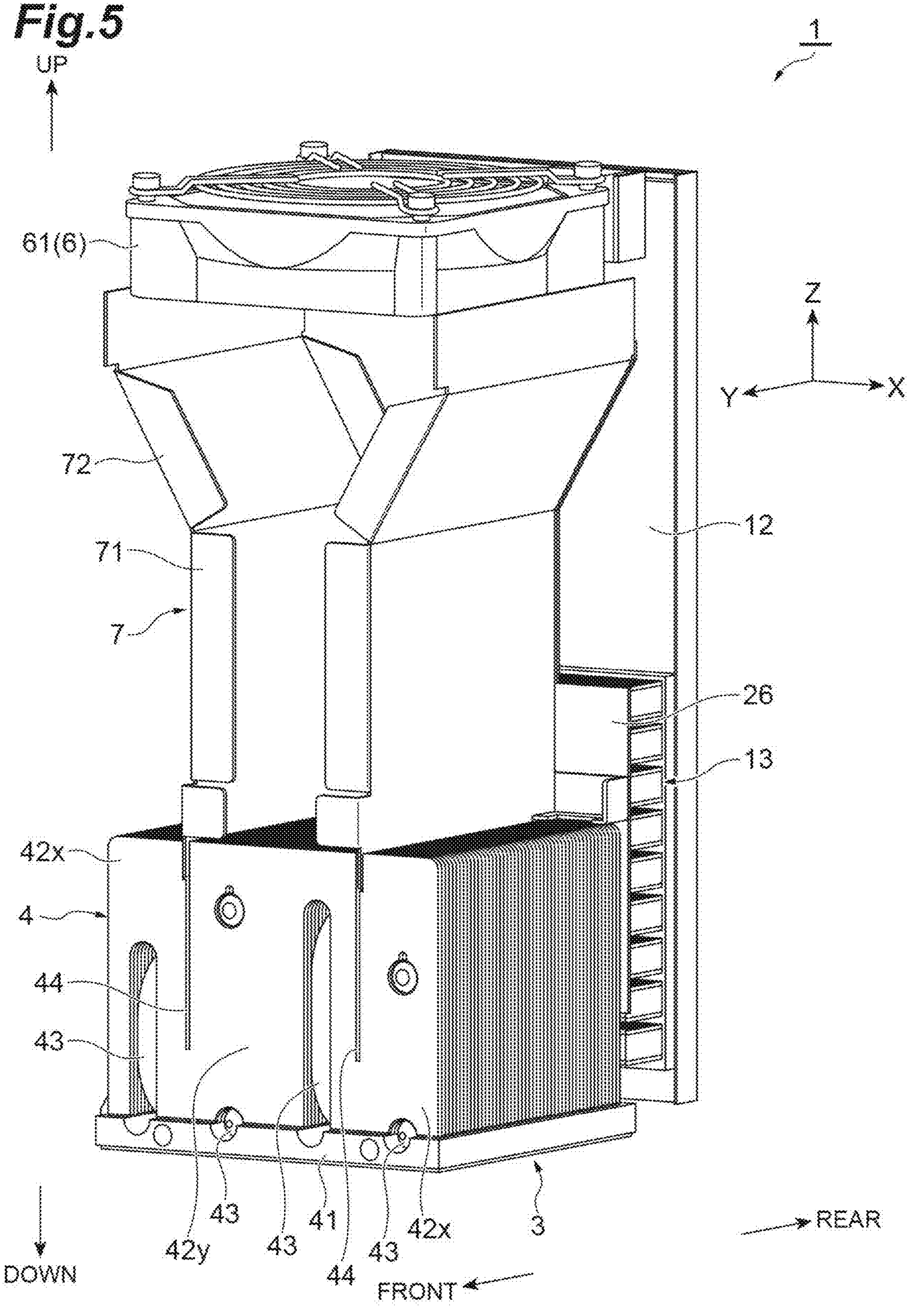
FIG. 5 is a perspective view illustrating an internal configuration of a housing in the active energy irradiation device illustrated in FIG. 2.

As illustrated in FIGS. 3 and 10, the active energy irradiation unit 3 has an emitting surface 30 that emits ultraviolet rays downward. In the active energy irradiation device 1, the emitting surface 30 is a surface on the lower side (outer surface) of the light irradiation window 24. The emitting surface 30 extends in both the X direction and the Y direction. In the active energy irradiation device 1, the emitting surface 30 is a surface perpendicular to the Z direction, and has a rectangular shape with the X direction as a longitudinal direction. As one example, a width 30*x* in the X direction of the emitting surface 30 is approximately 100 mm, and a width 30*y* in the Y direction of the emitting surface 30 is approximately 25 mm.

The inert gas supply unit 8 includes the spray port 83 that sprays the inert gas downward. In the active energy irradiation device 1, the spray port 83 has a slit shape extending in the X direction. The spray port 83 is located in front of the emitting surface 30. The inert gas supply unit 8 includes a spray portion 80 provided with the spray port 83. The spray portion 80 is a portion of the inert gas supply unit 8, a portion protruding downward with respect to the emitting surface 30 (portion below an alternate long and two short dashed lines illustrated in FIGS. 3 and 10). In the active energy irradiation device 1, the outer shape of the spray portion 80 has a rectangular plate shape with the X direction as a longitudinal direction and the Z direction as a thickness direction. The inert gas supply unit 8 is attached to the housing 2 (specifically, the wall portion 2*c* on the front side) such that the spray portion 80 is located below the emitting surface 30 in the Z direction.

Incidentally, "the spray port 83 sprays the inert gas downward" means that the spray direction of the inert gas sprayed from the spray port 83 has a downward component. Namely, the spray port 83 may not only spray the inert gas directly downward, for example, but also spray the inert gas in a direction inclined rearward from directly below.

The inert gas suction unit 9 includes a protrusion portion 90 protruding downward with respect to the emitting surface 30. The protrusion portion 90 is located behind the emitting surface 30. In the active energy irradiation device 1, the entirety of the inert gas suction unit 9 is the protrusion portion 90. The inert gas suction unit 9 is attached to the housing 2 (specifically, the lower wall 2*b*) such that the protrusion portion 90 (namely, the entirety of the inert gas suction unit 9) is located below the emitting surface 30 in the Z direction. The inert gas suction unit 9 includes the suction unit housing (box body) 91 provided with a plurality of the suction ports 92. In the active energy irradiation device 1, the outer shape of the suction unit housing 91 has a rectangular plate shape with the X direction as a longitudinal direction and the Z direction as a thickness direction.

In the active energy irradiation device 1, the surface on the lower side (outer surface) of the lower wall 2*b* is exposed between the emitting surface 30 and the spray portion 80 and between the emitting surface 30 and the protrusion portion 90. A distance between the emitting surface 30 and the protrusion portion 90 in the Y direction is smaller than a distance between the emitting surface 30 and the spray portion 80 in the Y direction. As one example, the distance between the emitting surface 30 and the spray portion 80 in the Y direction is approximately 40 mm, and the distance between the emitting surface 30 and the protrusion portion 90 in the Y direction is approximately 20 mm. The surface on the lower side of the lower wall 2*b* and a surface of the protrusion portion 90 are surfaces that absorb ultraviolet rays. As one example, the surface on the lower side of the lower wall 2*b* and the surface of the protrusion portion 90 may be black-painted surfaces, black-treated surfaces, or surfaces made of a black material.

A width 90*y* in the Y direction of the protrusion portion 90 is larger than a width 90*z* in the Z direction of the protrusion portion 90. The width 90*y* in the Y direction of the protrusion portion 90 is larger than or equal to nine times the width 90*z* in the Z direction of the protrusion portion 90. The width 90*y* is preferably larger than or equal to eight times the width 90*z*, more preferably larger than or equal to ten times the width 90*z*. A width 80*z* in the Z direction of the spray portion 80 is larger than the width 90*z* in the Z direction of the protrusion portion 90. As one example, a width 90*x* in the X direction of the protrusion portion 90 is approximately 100 mm, the width 90*y* in the Y direction of the protrusion portion 90 is approximately 45 mm, and the width 90*z* in the Z direction of the protrusion portion 90 is approximately 5 mm. As one example, a width 80*x* in the X direction of the spray portion 80 is approximately 100 mm, a width 80*y* in the Y direction of the spray portion 80 is approximately 25 mm, and the width 80*z* in the Z direction of the spray portion 80 is approximately 5 mm.

Each of a width in the X direction of the active energy irradiation unit 3, a width in the X direction of the inert gas supply unit 8, and a width in the X direction of the inert gas suction unit 9 is less than or equal to a width in the X direction of the housing 2. Each of a width 83*x* in the X direction of the spray port 83 and the width 90*x* in the X direction of the protrusion portion 90 is equal to the width 30*x* in the X direction of the emitting surface 30. Here, being equal means substantially being equal, and for example, means that each of the width 83*x* and the width 90*x* is 95% of the width 30*x* to 105% of the width 30*x*. Incidentally, each of the width 83*x* in the X direction of the spray port 83 and the width 90*x* in the X direction of the protrusion portion 90 may be smaller than the width 30*x* in the X direction of the emitting surface 30. Each of the width 83*x* and the width 90*x* is preferably 90% or more, more preferably 100% or more, and further preferably 110% or more of the width 30*x*.

As described above, in the active energy irradiation device 1, when the irradiation target S is conveyed from the front side to the rear side with respect to the emitting surface 30 of the active energy irradiation unit 3, the inert gas sprayed from the spray port 83 of the inert gas supply unit 8 is supplied to the region R between the irradiation target S and the active energy irradiation unit 3. At this time, since the protrusion portion 90 in which the width 90*y* in the Y direction is larger than the width 90*z* in the Z direction is located behind the emitting surface 30 of the active energy irradiation unit 3, it becomes difficult for the inert gas to flow out of the region R between the irradiation target S and the active energy irradiation unit 3 to a downstream side (rear side) in a conveying direction of the irradiation target S. Therefore, according to the active energy irradiation device 1, the mixing of oxygen into the region R between the irradiation target S and the active energy irradiation unit 3 can be suppressed. According to the active energy irradiation device 1, even when the conveying speed of the irradiation target S has increased, without significantly increasing the amount of the inert gas supplied to the inert gas supply unit 8, a high-concentration and uniform nitrogen gas atmosphere can be created in the region R between the irradiation target S and the active energy irradiation unit 3.

In the active energy irradiation device 1, the inert gas supply unit 8 includes the spray portion 80 provided with the spray port 83 and protruding downward with respect to the emitting surface 30.

Accordingly, it becomes difficult for air to flow from an upstream side (front side) in the conveying direction of the irradiation target S into the region R between the irradiation target S and the active energy irradiation unit 3. Therefore, the mixing of oxygen into the region R between the irradiation target S and the active energy irradiation unit 3 can be more reliably suppressed.

In the active energy irradiation device 1, the width 80*z* in the Z direction of the spray portion 80 is larger than the width 90*z* in the Z direction of the protrusion portion 90. Accordingly, the spray port 83 of the inert gas supply unit 8 is close to the irradiation target S, so that it becomes difficult for air to flow from the upstream side in the conveying direction of the irradiation target S into the region R between the irradiation target S and the active energy irradiation unit 3. Therefore, the mixing of oxygen into the region R between the irradiation target S and the active energy irradiation unit 3 can be more reliably suppressed.

In the active energy irradiation device 1, each of the width in the X direction of the active energy irradiation unit 3, the width in the X direction of the inert gas supply unit 8, and the width in the X direction of the inert gas suction unit 9 is less than or equal to the width in the X direction of the housing 2. Accordingly, the plurality of active energy irradiation devices 1 can be arranged such that the housings 2 come into contact with each other in the X direction, and can correspond to the irradiation target S with a wide width in the X direction.

In the active energy irradiation device 1, each of the width 83*x* in the X direction of the spray port 83 and the width 90*x* in the X direction of the protrusion portion 90 is equal to the width in the X direction of the emitting surface 30. Accordingly, in the plurality of active energy irradiation devices 1 arranged such that the housings 2 come into contact with each other in the X direction, the irradiation target S with a wide width in the X direction can be uniformly irradiated with ultraviolet rays while suppressing the mixing of oxygen into the regions R between the irradiation target S and a plurality of the active energy irradiation units 3.

In the active energy irradiation device 1, the inert gas suction unit 9 is detachably attached to the housing 2. Accordingly, the replacement and maintenance of the inert gas suction unit 9 can be easily performed.

In the active energy irradiation device 1, the protrusion portion 90 has a surface that absorbs ultraviolet rays. Accordingly, it can be prevented that ultraviolet rays are reflected by the protrusion portion 90 and undesired locations are irradiated with the ultraviolet rays. For example, the ink head (not illustrated) disposed on the upstream side of the active energy irradiation device 1 can be prevented from being irradiated with ultraviolet rays reflected by the protrusion portion 90, and the photocurable ink can be prevented from being cured in the ink head.

In the active energy irradiation device 1, the inert gas suction unit 9 includes the suction unit housing 91 that is a box body. Accordingly, the flowing of the inert gas out of the region R between the irradiation target S and the active energy irradiation unit 3 to the downstream side in the conveying direction of the irradiation target S can be suppressed.

In the active energy irradiation device 1, the inert gas suction unit 9 includes the suction ports 92 that suction the inert gas. Accordingly, the inert gas supplied to the region R between the irradiation target S and the active energy irradiation unit 3 can be efficiently recovered.

In the active energy irradiation device 1, the active energy irradiation unit 3 emits ultraviolet rays as active energy rays. Accordingly, the active energy irradiation device 1 can be used as a device that irradiates the irradiation target S with ultraviolet rays.

In the active energy irradiation device 1, the distance between the emitting surface 30 and the protrusion portion 90 in the Y direction is smaller than the distance between the emitting surface 30 and the spray portion 80 in the Y direction. Accordingly, a decrease in the concentration of the inert gas in the region R between the irradiation target S and the active energy irradiation unit 3 can be suppressed.

Experimental results for confirming actions and effects will be described with reference to FIGS. 11 and 12.

Figure 11:
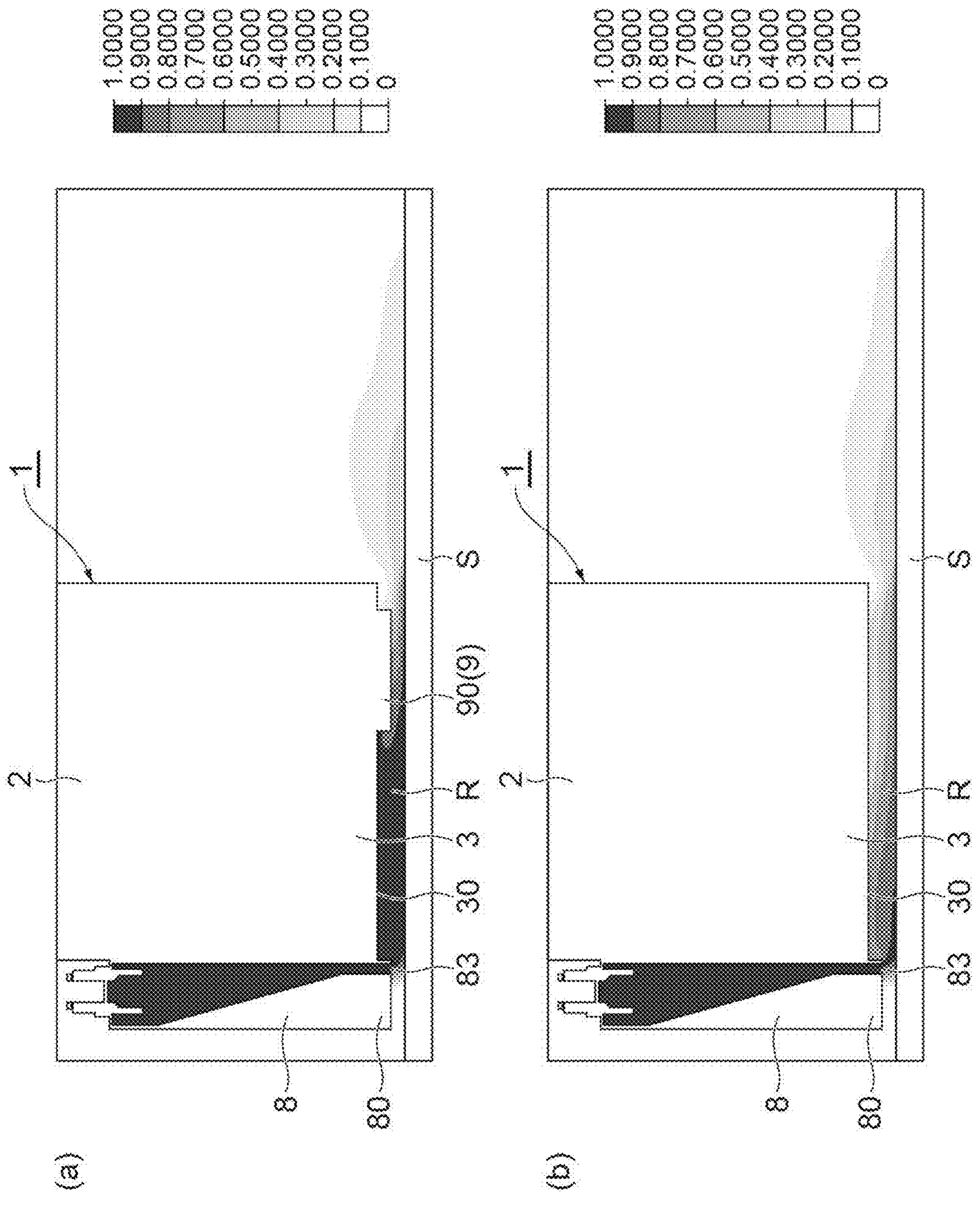
FIG. 11 is a view illustrating experimental results.

As the active energy irradiation device 1 of Example, as illustrated in FIG. 11(*a*), the active energy irradiation device 1 was prepared that included the protrusion portion 90 with a width of 45 mm in the Y direction (horizontal direction in the figure) and a width of 5 mm in the Z direction (vertical direction in the figure). In the active energy irradiation device 1 of Example, the distance between the spray port 83 and the protrusion portion 90 was set to 85 mm. In the active energy irradiation device 1 of Example, the irradiation target S was conveyed from the left to the right in the figure at 150 m/min while supplying nitrogen gas to the inert gas supply unit 8 at 27 L/mm. As a result, as illustrated in FIG. 11(*a*), a high-concentration and uniform nitrogen gas atmosphere was created in the region R between the irradiation target S and the active energy irradiation unit 3.

As the active energy irradiation device 1 of Comparative Example 1, as illustrated in FIG. 11(*b*), the active energy irradiation device 1 was prepared that did not have a configuration corresponding to the protrusion portion 90. Other configurations were the same as those of the active energy irradiation device 1 of Example. In the active energy irradiation device 1 of Comparative Example 1, the irradiation target S was conveyed from the left to the right in the figure at 150 m/min while supplying nitrogen gas to the inert gas supply unit 8 at 27 L/mm. As a result, as illustrated in FIG. 11(*b*), a sufficient nitrogen gas atmosphere was not created in the region R between the irradiation target S and the active energy irradiation unit 3.

Figure 12:
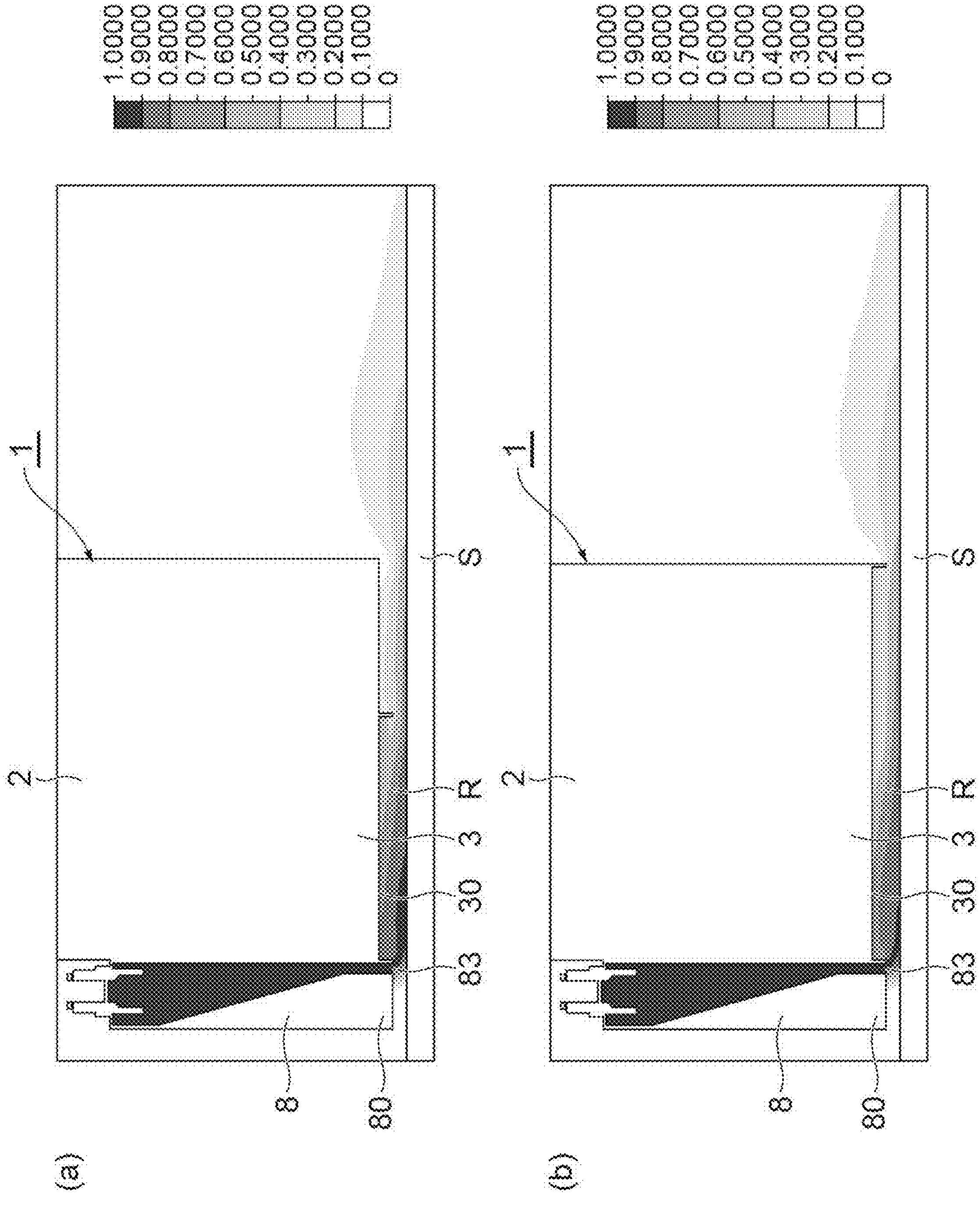
FIG. 12 is a view illustrating experimental results.

As the active energy irradiation device 1 of Comparative Example 2, as illustrated in FIG. 12(*a*), the active energy irradiation device 1 was prepared that had a configuration corresponding to the protrusion portion 90 with a width of 1 mm in the Y direction and a width of 5 mm in the Z direction. In the active energy irradiation device 1 of Comparative Example 2, the distance between the spray port 83 and the configuration corresponding to the protrusion portion 90 was set to 85 mm Other configurations were the same as those of the active energy irradiation device 1 of Example. In the active energy irradiation device 1 of Comparative Example 2, the irradiation target S was conveyed from the left to the right in the figure at 150 m/min while supplying nitrogen gas to the inert gas supply unit 8 at 27 L/mm. As a result, as illustrated in FIG. 12(*a*), a sufficient nitrogen gas atmosphere was not created in the region R between the irradiation target S and the active energy irradiation unit 3.

As the active energy irradiation device 1 of Comparative Example 3, as illustrated in FIG. 12(*b*), the active energy irradiation device 1 was prepared that had a configuration corresponding to the protrusion portion 90 with a width of 1 mm in the Y direction and a width of 5 mm in the Z direction. In the active energy irradiation device 1 of Comparative Example 3, the distance between the spray port 83 and the configuration corresponding to the protrusion portion 90 was set to 139 mm Other configurations were the same as those of the active energy irradiation device 1 of Example. In the active energy irradiation device 1 of Comparative Example 3, the irradiation target S was conveyed from the left to the right in the figure at 150 m/min while supplying nitrogen gas to the inert gas supply unit 8 at 27 L/mm. As a result, as illustrated in FIG. 12(3), a sufficient nitrogen gas atmosphere was not created in the region R between the irradiation target S and the active energy irradiation unit 3.

From the above experimental results, it was found that when the protrusion portion 90 in which the width in the Y direction was larger than the width in the Z direction was located behind (right side in the figures) the emitting surface 30 of the active energy irradiation unit 3 (the active energy irradiation device 1 of Example), it became difficult for nitrogen gas to flow out of the region R between the irradiation target S and the active energy irradiation unit 3 to the downstream side in the conveying direction of the irradiation target S (right side in the figures). It was found that even when the configuration corresponding to the protrusion portion 90 in which the width in the Y direction was smaller than the width in the Z direction was located behind the emitting surface 30 of the active energy irradiation unit 3 (the active energy irradiation device 1 of Comparative Example 2 and the active energy irradiation device 1 of Comparative Example 3), only substantially the same effects as when the configuration corresponding to the protrusion portion 90 (the active energy irradiation device 1 of Comparative Example 1) was not located could be obtained.

Figure 13:
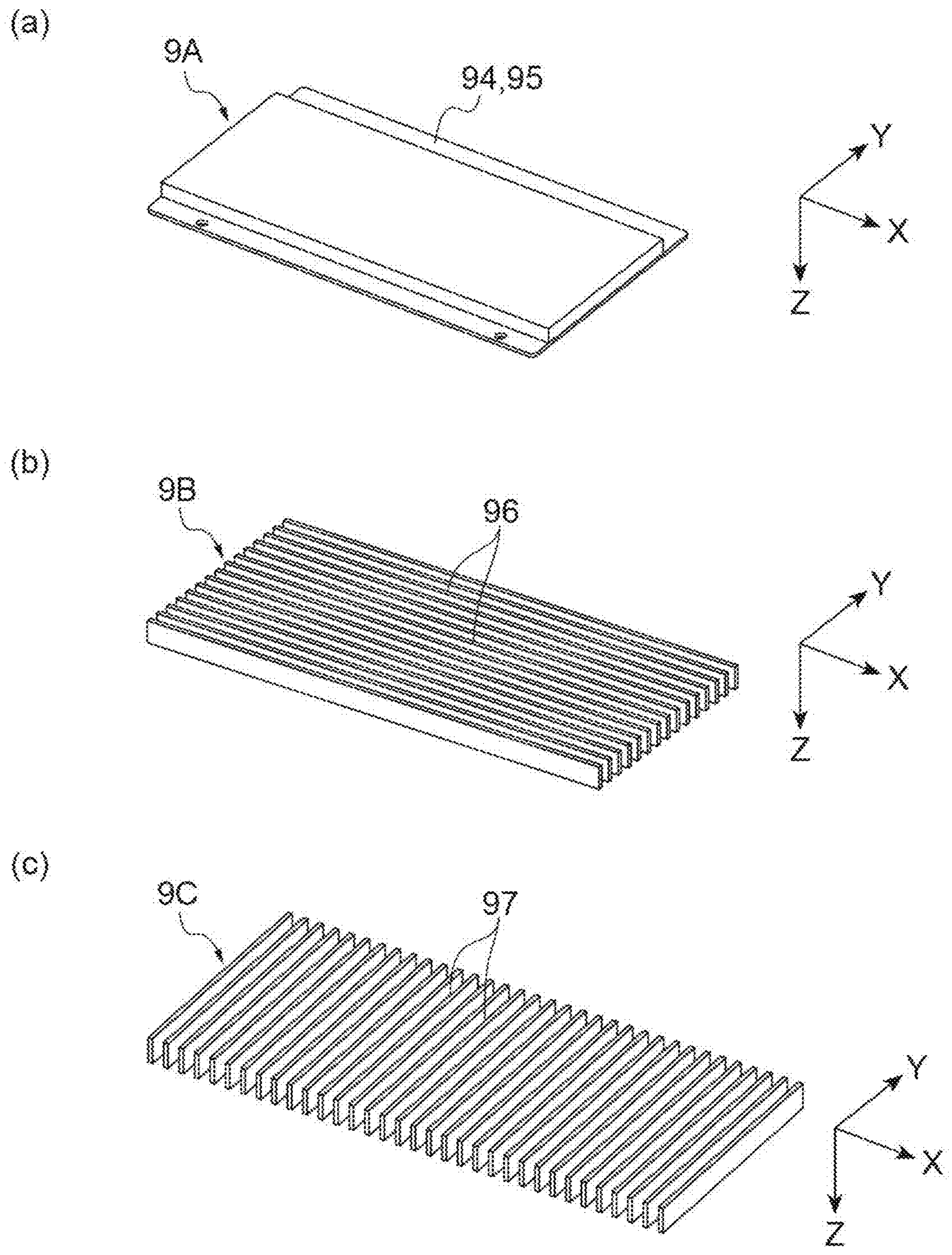
FIG. 13 is a perspective view of structures according to modification examples.

The present disclosure is not limited to the above-described embodiment. For example, the structure including the protrusion portion 90 is not limited to the inert gas suction unit 9. As one example, instead of the inert gas suction unit 9, a structure 9A illustrated in FIG. 13(*a*), a structure 9B illustrated in FIG. 13(*b*), or a structure 9C illustrated in FIG. 13(*c*) may be applied to the active energy irradiation device 1. As illustrated in FIG. 13(*a*), the structure 9A includes a box body 94 or a block body 95. The outer shape of the box body 94 or the block body 95 has a rectangular plate shape with the X direction as a longitudinal direction and the Z direction as a thickness direction. As illustrated in FIG. 13(*b*), the structure 9B includes a plurality of plate bodies 96 arranged in the Y direction. Each of the plate bodies 96 has, for example, a rectangular plate shape with the X direction as a longitudinal direction and the Y direction as a thickness direction. As illustrated in FIG. 13(*c*), the structure 9C includes a plurality of plate bodies 97 arranged in the X direction. Each of the plate bodies 97 has, for example, a rectangular plate shape with the Y direction as a longitudinal direction and the X direction as a thickness direction.

In the structures (for example, the inert gas suction unit 9 and the structures 9A, 9B, and 9C) including the protrusion portion 90, the protrusion portion 90 protruding downward with respect to the emitting surface 30 may be a portion of the structures. In that case, at least the protrusion portion 90 may have a surface that absorbs ultraviolet rays.

The structures (for example, the inert gas suction unit 9 and the structures 9A, 9B, and 9C) including the protrusion portion 90 are not limited to being detachably attached to the housing 2 by fasteners such as screws, and a detachable attachment structure may be other known attachment structures. For example, each structure includes a guided portion that is slidable with respect to a guide portion of the housing 2, and each structure may be detachably attached to the housing 2 thereby.

The inert gas supply unit 8 may not include the portion protruding downward with respect to the emitting surface 30. The spray port 83 may be provided at a portion of the inert gas supply unit 8, which is located above the emitting surface 30.

The support body that supports the active energy irradiation unit 3, the inert gas supply unit 8, and the structure (for example, the inert gas suction unit 9 or the structure 9A, 9B, or 9C) is not limited to the housing 2, and other support structures such as a frame may be provided.

Figure 14:
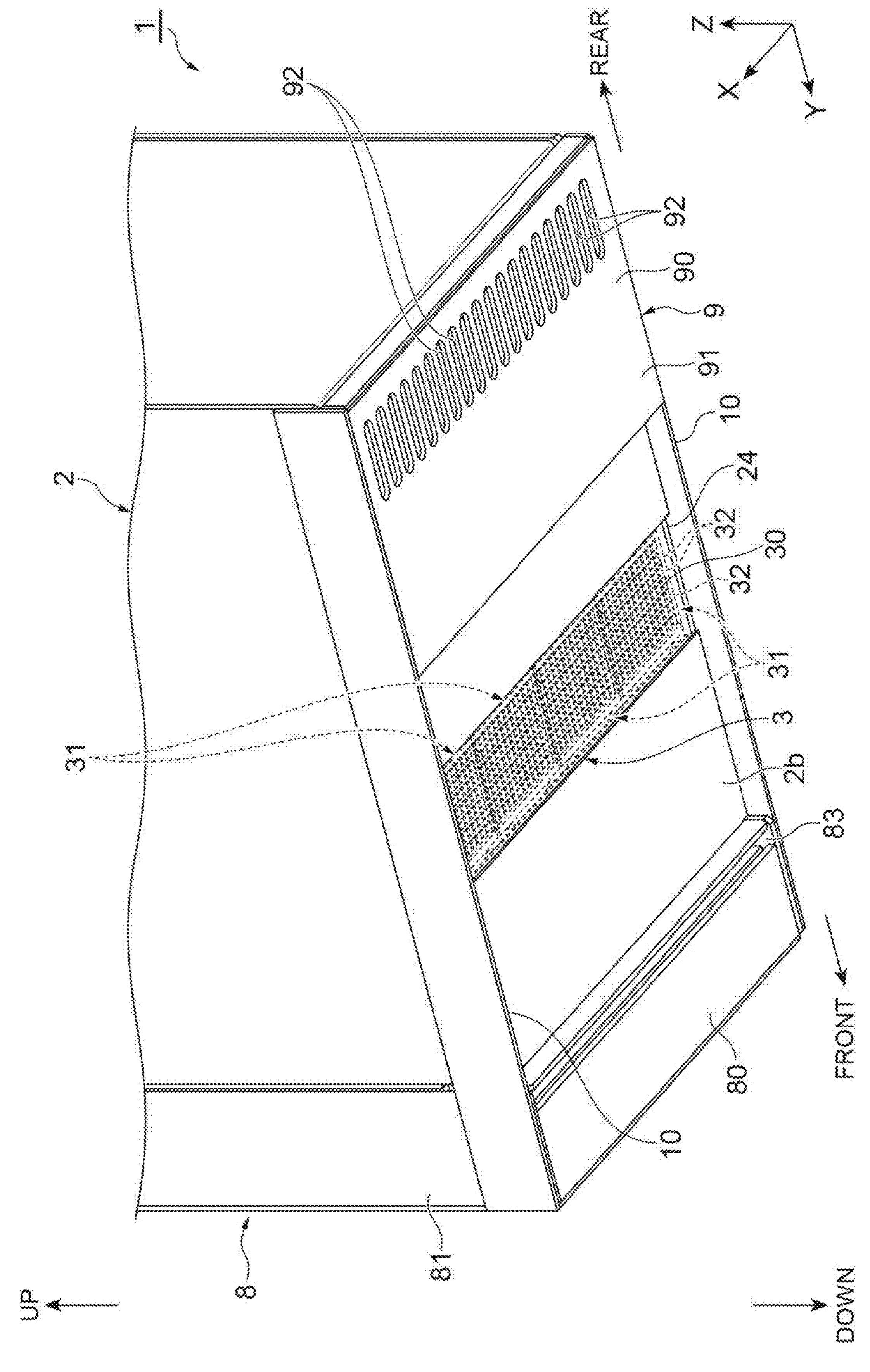
FIG. 14 is a perspective view of an active energy irradiation device according to a modification example when viewed from below.

As illustrated in FIG. 14, the active energy irradiation device 1 may include a pair of shielding plates 10 disposed on one side and the other side in the X direction with respect to the emitting surface 30 of the active energy irradiation unit 3. Accordingly, for example, even when the active energy irradiation device 1 is used alone, it becomes difficult for the inert gas to flow out of the region R between the irradiation target S and the active energy irradiation unit 3 to the one side and the other side in the X direction. Therefore, the mixing of oxygen into the region R between the irradiation target S and the active energy irradiation unit 3 can be more reliably suppressed.

The active energy irradiation unit 3 is not limited to emitting ultraviolet rays, and may emit other active energy rays such as electron beams. Namely, in the above description, the "ultraviolet rays" can be reworded as "electron beams" or "active energy rays".

Various materials and shapes can be applied to each configuration in the embodiment and the modification examples described above without being limited to the materials and shapes described above. Each configuration in the embodiment or the modification examples described above can be arbitrarily applied to each configuration in other embodiments or modification examples.

REFERENCE SIGNS LIST

1: active energy irradiation device, 2: housing (support body), 3: active energy irradiation unit, 30: emitting surface, 8: inert gas supply unit, 10: shielding plate, 80: spray portion, 83: spray port, 9: inert gas suction unit (structure), 9A, 9B, 9C: structure, 90: protrusion portion, 91: suction unit housing (box body), 92: suction port.

The invention claimed is:

1. An active energy irradiation device comprising:

an active energy irradiation unit having an emitting surface extending in both a first direction and a second direction perpendicular to the first direction, the emitting surface configured to emit an active energy ray to one side in a third direction perpendicular to both the first direction and the second direction;

an inert gas supply unit having a spray port located on one side in the second direction with respect to the emitting surface, the spray port configured to spray an inert gas to the one side in the third direction; and a structure including a protrusion portion located on the other side in the second direction with respect to the emitting surface, the protrusion portion protruding to the one side in the third direction with respect to the emitting surface, wherein a width in the second direction of the protrusion portion is larger than a width in the third direction of the protrusion portion.

2. The active energy irradiation device according to claim 1, wherein the inert gas supply unit includes a spray portion provided with the spray port, the spray portion protruding to the one side in the third direction with respect to the emitting surface.

3. The active energy irradiation device according to claim 2, wherein a width in the third direction of the spray portion is larger than the width in the third direction of the protrusion portion.

4. The active energy irradiation device according to claim 1, further comprising:

a support body supporting the active energy irradiation unit, the inert gas supply unit, and the structure, wherein each of a width in the first direction of the active energy irradiation unit, a width in the first direction of the inert gas supply unit, and a width in the first direction of the structure is less than or equal to a width in the first direction of the support body.

5. The active energy irradiation device according to claim 4, wherein each of a width in the first direction of the spray port and a width in the first direction of the protrusion portion is equal to a width in the first direction of the emitting surface.

6. The active energy irradiation device according to claim 4, wherein the structure is detachably attached to the support body.

7. The active energy irradiation device according to claim 1, wherein at least the protrusion portion has a surface configured to absorb the active energy ray.

8. The active energy irradiation device according to claim 1, wherein the structure includes a box body or a block body.

9. The active energy irradiation device according to claim 1, wherein the structure includes a plurality of plate bodies.

10. The active energy irradiation device according to claim 1, wherein the structure having a suction port configure to suction the inert gas.

11. The active energy irradiation device according to claim 1, further comprising:

a pair of shielding plates disposed on one side and the other side in the first direction with respect to the emitting surface.

12. The active energy irradiation device according to claim 1, wherein the active energy irradiation unit emits an ultraviolet ray or an electron beam as the active energy ray.

* * * * *